(12) United States Patent
Chen et al.

(10) Patent No.: US 7,999,902 B2
(45) Date of Patent: Aug. 16, 2011

(54) LIQUID CRYSTAL DISPLAY PANEL

(75) Inventors: Te-Yu Chen, Kaohsiung (TW);
Chin-Lung Yeh, Taoyuan County (TW);
Yu-Fang Wang, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 291 days.

(21) Appl. No.: 12/353,947

(22) Filed: Jan. 14, 2009

(65) Prior Publication Data

US 2010/0085526 A1 Apr. 8, 2010

(30) Foreign Application Priority Data

Oct. 6, 2008 (TW) .............................. 97138377 A

(51) Int. Cl.
*G02F 1/1345* (2006.01)
(52) U.S. Cl. ......... 349/152; 349/110; 349/149; 349/153
(58) Field of Classification Search ................. 349/139, 349/149, 151, 152, 153, 190, 110
See application file for complete search history.

(56) References Cited

U.S. PATENT DOCUMENTS

| 2002/0122143 A1* | 9/2002 | Woo et al. ........................ 349/42 |
| 2004/0201812 A1* | 10/2004 | Chu et al. ....................... 349/153 |
| 2005/0248708 A1 | 11/2005 | Park |

FOREIGN PATENT DOCUMENTS

| KR | 2006-0129556 | * 12/2006 |
| TW | 589498 | 6/2004 |

* cited by examiner

*Primary Examiner* — Dung Nguyen
*Assistant Examiner* — Tai Duong
(74) *Attorney, Agent, or Firm* — Winston Hsu; Scott Margo

(57) ABSTRACT

A liquid crystal display panel includes a first transparent substrate, a second transparent substrate opposite to the first transparent substrate, and a sealant disposed therebetween. The first transparent substrate includes a peripheral region, and a plurality of conductive lines disposed in the peripheral region. The conductive lines include a plurality of transparent conductive lines and non-transparent conductive lines. The sealant is disposed in the peripheral region.

10 Claims, 4 Drawing Sheets

LIQUID CRYSTAL DISPLAY PANEL

BACKGROUND OF THE INVENTION

1. Field of the Invention

The present invention relates to a liquid crystal display panel, and more particularly, to a one drop fill (ODF) liquid crystal display panel, which has transparent conductive lines and non-transparent conductive lines alternately disposed in the peripheral region thereof. The alternation of transparent conductive lines and non-transparent conductive lines facilitates irradiation hardening of a sealant, and also improves process window of forming the closely arranged conductive lines.

2. Description of the Prior Art

The liquid crystal display panel essentially consists of two transparent substrates and a liquid crystal layer capable of changing the polarizing direction of an incident light disposed therebetween. Nowadays, the methods of filling liquid crystal molecules mainly include two types: vacuum injection and ODF. Since the vacuum injection process is time-consuming and the time for injection increases when the size of the liquid crystal display panel increases, the vacuum injection accordingly is mainly applied to tiny size liquid crystal display panels. In an ODF process, adequate liquid crystal molecules are directly dropped onto a transparent substrate, and two transparent substrates are then assembled in vacuum by sealant. Ultraviolet beam is subsequently utilized to irradiate the sealant and harden the sealant so that the sealant consequently turns sticky. Compared with the vacuum injection process, time for the ODF process obviously decreases, and the ODF process have consequently been widely applied to various types of liquid crystal display panels.

The ODF process has aforementioned advantages, though, the sealant has to be thoroughly irradiated by ultraviolet beam to become completely strengthened such that the transparent substrates are perfectly affixed and combined together, and the sealant would not contaminate and influence the liquid crystal molecules. Please refer to FIG. 1 and FIG. 2. FIG. 1 and FIG. 2 are schematic diagrams illustrating an array substrate of a conventional ODF LCD panel, where FIG. 1 is a top view diagram illustrating the ODF LCD panel and FIG. 2 is a cross-sectional view diagram illustrating the ODF LCD panel shown in FIG. 1. As shown in FIG. 1 and FIG. 2, the ODF LCD panel 10 includes an array substrate 10A and a color filter substrate 10B (not shown in FIG. 1) facing the array substrate 10A. The ODF LCD panel 10 includes a display region 12 and a peripheral region 14. The display region 12 includes a plurality of scan lines 16, a plurality of data lines 18 orthogonally arranged with respect to the scan lines 16, and pixels 20 defined by the scan lines 16 and the data lines 18. The peripheral region 14 includes a plurality of non-transparent metal conductive lines 22 respectively connected to the terminal of each of the scan lines 16 and each of the data lines 18. Accordingly, the scan lines 16 and the data lines 18 can be electrically connected to the bordering region of the peripheral region 14 therethrough to further provide an electrical connection with driver ICs. In the bargain, the peripheral region 14 further includes a sealant 24 and a black matrix pattern 26, where the sealant 24 is used to combine the array substrate 10A with the color filter substrate 10B. Additionally, the black matrix pattern 26, which is disposed on a position of the color filter substrate 10B corresponding to the sealant 24, has a function of shielding light leakage in the peripheral region 14. As described, the sealant 24 has to be irradiated by ultraviolet beam to become completely strengthened for providing adhesion characteristic. Since the black matrix pattern layer 26 is disposed on one side of the color filter substrate 10B, the sealant 24 cannot be irradiated by ultraviolet beam from the direction of the color filter substrate 10B. Instead, the sealant 24 consequently has to be irradiated by ultraviolet beam from the direction of the array substrate 10A. As shown in FIG. 2, however, ultraviolet beam coming from the direction of the array substrate 10A to the sealant 24 will be blocked by the metal conductive lines 22, which are non-transparent, disposed on the surface of the peripheral region 14 of the array substrate 10A as indicated by the arrows in FIG. 2. Therefore, the sealant 24 cannot be completely hardened, and the sealant 24 may contaminate the liquid crystal molecules, decay the efficiency of the liquid crystal molecules, and influence the displaying quality of the ODF LCD panel 10. In addition, the arrangement density of the metal conductive lines 22 will be excessively high when a small size LCD panel with a smaller peripheral region 14 is to be formed, and this increases fabrication difficulty due to process limitation both for an ODF LCD or a vacuum fill LCD.

SUMMARY OF THE INVENTION

It is therefore one of the objects of the present invention to provide a liquid crystal display panel for preventing liquid crystal contamination and improving yield.

To achieve the aforementioned object, the present invention provides a liquid crystal display panel, which includes a first transparent substrate, a second transparent substrate disposed facing the first transparent substrate, and a sealant disposed therebetween. The first transparent substrate includes a peripheral region and a plurality of conductive lines disposed thereon. The conductive lines include a plurality of transparent conductive lines and a plurality of non-transparent conductive lines. The sealant is disposed in the peripheral region between the first transparent substrate and the second transparent substrate.

The liquid crystal display panel of the present invention uses alternately arranged transparent conductive lines and non-transparent conductive lines, and therefore increase the overall transmittance. Consequently, the sealant disposed in the peripheral region can be thoroughly irradiated and hardened by ultraviolet beam without contaminating the liquid crystal. Furthermore, the method of disposing the transparent conductive lines and non-transparent conductive lines in different material layers is also capable of increasing the process window and improving yield.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
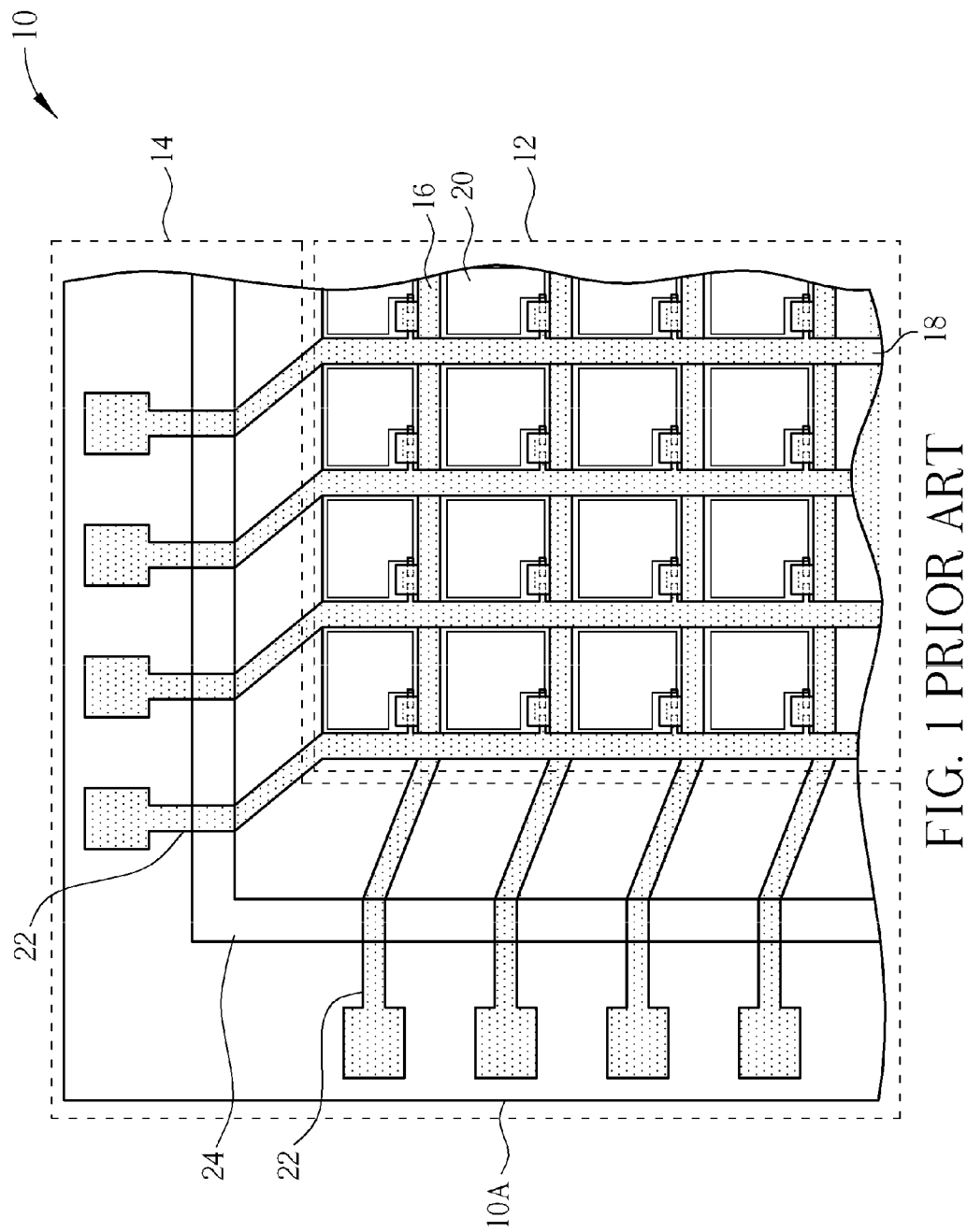
FIG. 1 and FIG. 2 are schematic diagrams illustrating an array substrate of a conventional ODF LCD panel.
Figure 2:
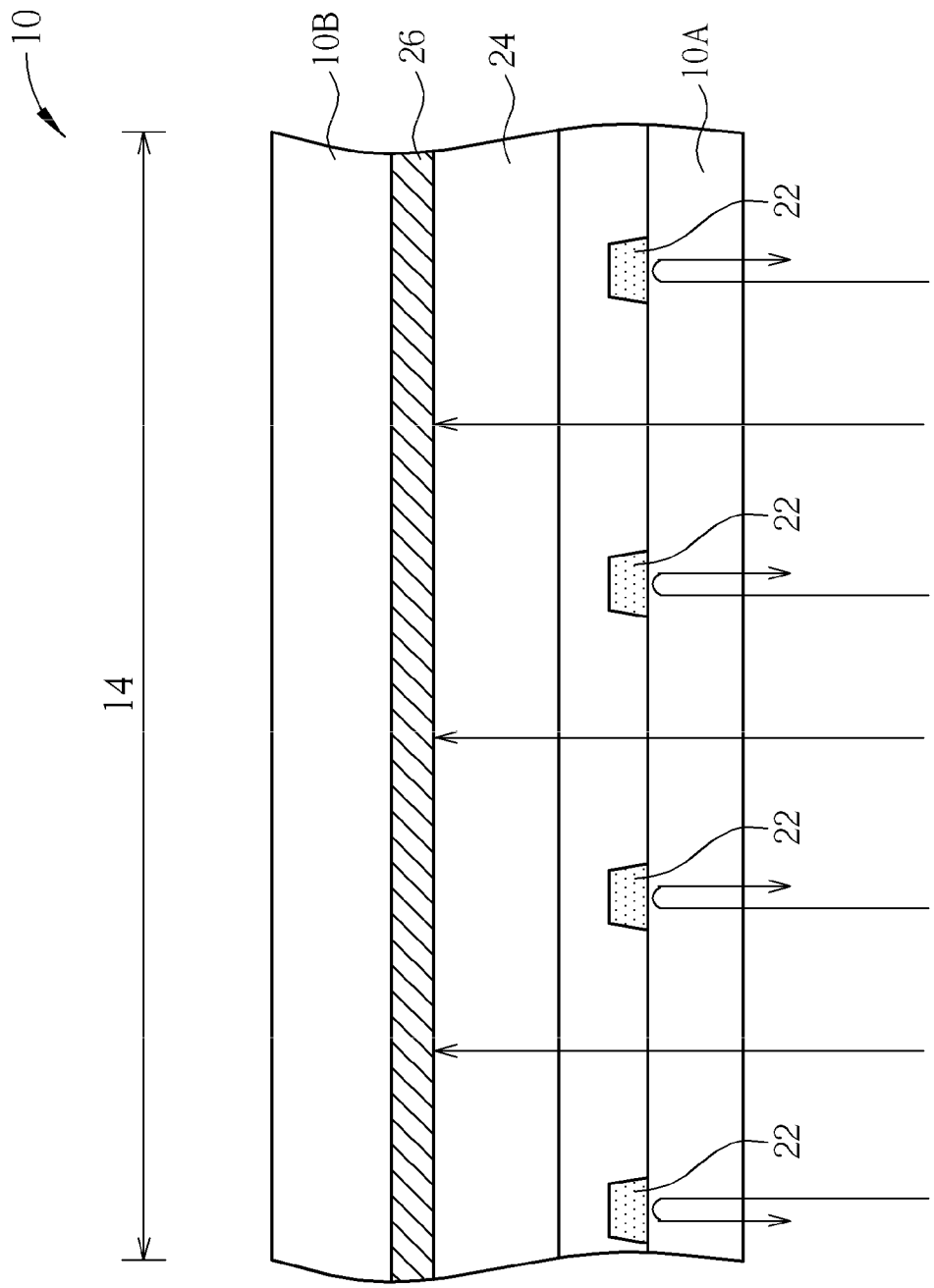
Figure 3:
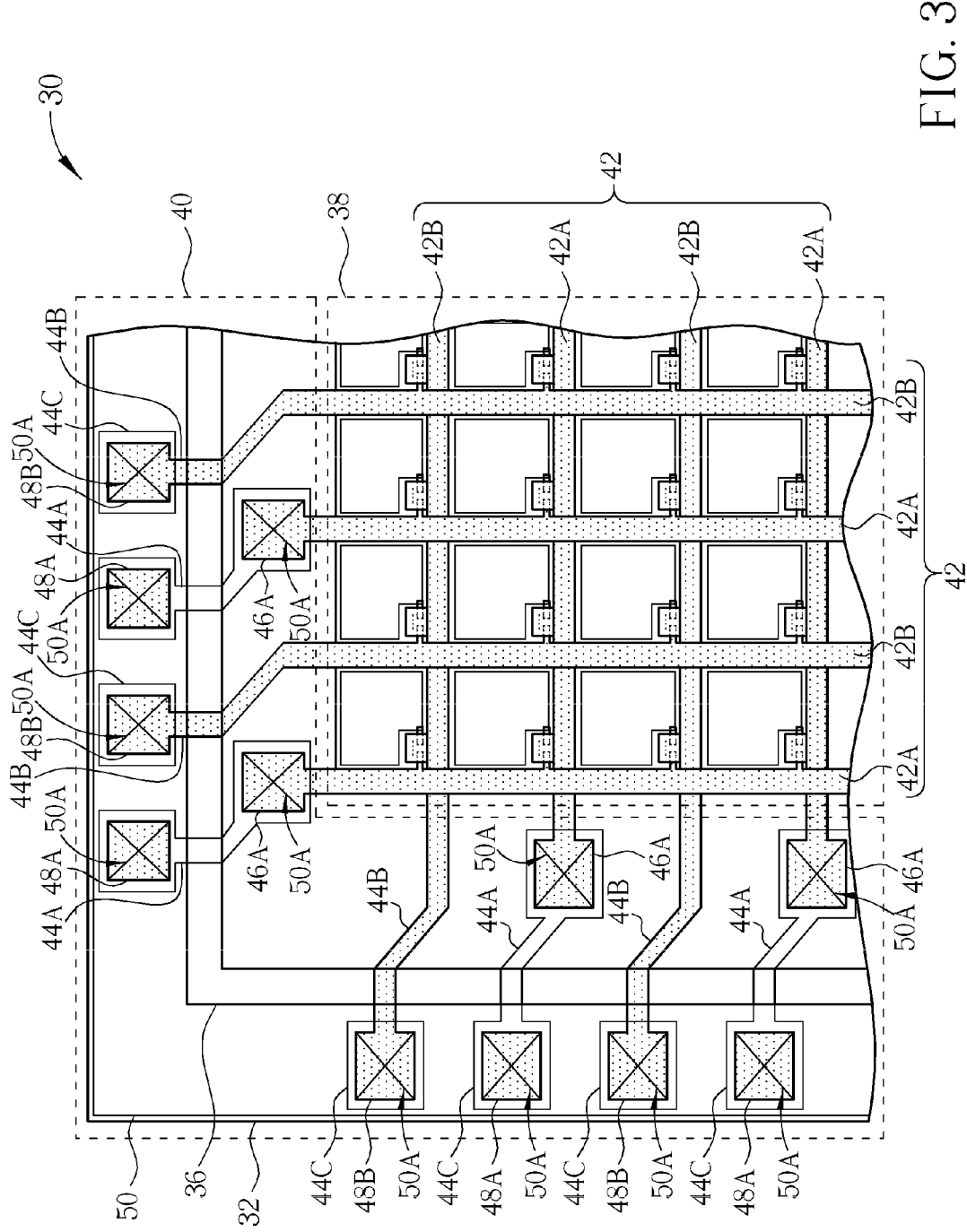
FIG. 3 and FIG. 4 are schematic diagrams illustrating a preferred embodiment of a liquid crystal display panel of the present invention.
Figure 4:
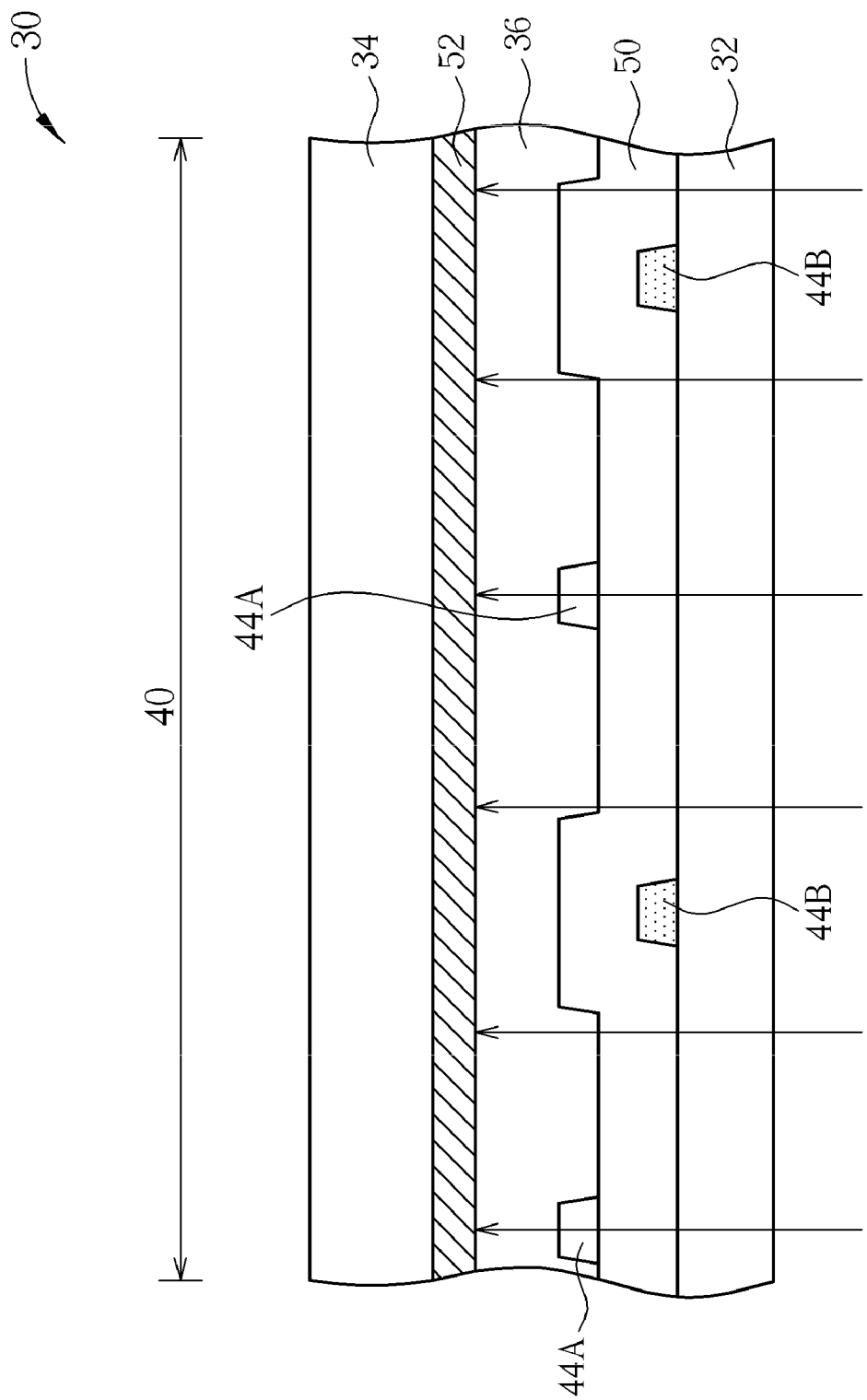

Please refer to FIG. 3 and FIG. 4. FIG. 3 and FIG. 4 are schematic diagrams illustrating a preferred embodiment of a liquid crystal display panel of the present invention. Herein, the liquid crystal display panel of the present invention is an ODF LCD panel, FIG. 3 is a top view diagram illustrating the liquid crystal display panel, and FIG. 4 is a cross-sectional view diagram illustrating the liquid crystal display panel shown in FIG. 3. As shown in FIG. 3 and FIG. 4, the liquid crystal display panel 30 of the present embodiment includes a first transparent substrate 32, a second transparent substrate 34, and a sealant 36. The liquid crystal molecules (not shown in figure) are disposed between the first transparent substrate 32 and the second transparent substrate 34 by virtue of ODF method. The first transparent substrate 32 is an array substrate (as also referred to as thin film transistor substrate), and the second transparent substrate 34 is a color filter substrate (as also referred to as counter substrate). The first transparent substrate 32 is disposed opposite to the second substrate 34. The first transparent substrate 32 and the second transparent substrate 34 are made of transparent material e.g. glass, quartz or plastic. The first transparent substrate 32 includes a display region 38, a peripheral region 40, a plurality of metal wires 42 disposed in the display region 38, and a plurality of conductive lines disposed in the peripheral region 40. The metal wires 42 disposed in the display region 38 may be e.g. scan lines or data lines, and the metal wires 42 can include a plurality of first metal wires 42A and a plurality of second metal wires 42B. In the present embodiment, the first metal wires 42A and the second metal wires 42B are alternately arranged, i.e. the first metal wires 42A can be odd metal wires 42, while the second metal wires 42B can be even metal wires 42 but not limited thereto. Besides, each of the first metal wires 42A includes an inner contact pad 46A and an outer contact pad 48A. Each of the inner contact pad 46A, which is electrically connected to the corresponding first metal wire 42A, extends to the periphery region 40 between the sealant 36 and the display region 38, but each of the outer contact pad 48A, which is not electrically connecting with the first metal wire 42A, is disposed in the peripheral region 40 outside the sealant 36.

On the other hand, the conductive lines disposed in the periphery region 40 include a plurality of transparent conductive lines 44A and a plurality of non-transparent conductive lines 44B. The transparent conductive lines 44A are disposed corresponding to and electrically connected to the first metal wires 42A, while the non-transparent conductive lines 44B are disposed corresponding to and electrically connected to the second metal wires 42B. Accordingly, the transparent conductive lines 44A and non-transparent conductive lines 44B are alternately arranged but the application of the present invention is not limited thereto. For instance, the transparent conductive lines 44A and non-transparent conductive lines 44B can be arranged in any other orders. The transparent conductive lines 44A are made of transparent material e.g. Indium Tin Oxide (ITO), while the non-transparent conductive lines 44B are made of non-transparent material e.g. metal. The non-transparent conductive lines 44B are directly electrically connected to the second metal wires 42B. Consequently, it is preferable that the non-transparent conductive 44B and the metal wires 42 are made of the same metal layer. For example, if the metal wires 42 are scan lines, the non-transparent conductive lines 44B and the scan lines can be made of the same layout layer. If the metal wires 42 are data lines, the non-transparent conductive lines and the data lines can be made of the same layout layer. Moreover, each of the non-transparent conductive lines 44B can include an outer contact pad 48B, where each of the outer contact pad 48B is electrically connected to the non-transparent conductive lines 44B and disposed in the peripheral region 40 outside the sealant 36.

Each of the transparent conductive lines 44A bridges the corresponding inner contact pad 46A and the corresponding outer contact pad 48A, and partially overlaps with the corresponding inner contact pads 46A and the corresponding outer contact pad 48A in perpendicular direction. Besides, the first transparent substrate 32 further includes an insulating layer 50 disposed between the first metal wire 42A and the transparent conductive lines 44A. The insulating layer 50 includes a plurality of contact holes 50A respectively exposing each of the inner contact pads 46A and each of the outer contact pads 48A, so that each of the transparent conductive lines 44 embedded in each of the contact holes 50A forms electrical connection with each of the inner contact pads 46A and each of outer contact pads 48A. As a result, each of the inner contact pads 46A and each of the outer contact pads 46B are bridged and electrically connected afterward by each of the transparent conductive lines 44A. The transparent conductive material of the transparent conductive lines 44A has different electrical impedance with that of the first metal wire 42A. Accordingly, when it comes to fabrication, increasing the size of the inner contact pads 46A, the outer contact pads 46B and the contact holes 50A facilitates the increase of the contact area between the transparent conductive line 44A and the first metal wire 42A, and therefore reduce the contact impedance. In addition, anti-oxidation material e.g. nickel can be added into the first metal wires 42A during the deposition process, so as to reduce oxidation reaction generated in the first metal wires 42A and accordingly lower the contact impedance between the transparent conductive lines 44A and the first metal wires 42A.

In addition, the contact holes 50A of the insulating layer 50 may expose each of the outer contact pads 48B of the non-transparent conductive lines 44B, such that a transparent conductive layer 44C, which is concurrently formed with the transparent conductive lines 44B, covers the surface of the outer contact pad 48B. The transparent conductive layer 44C electrically disconnected to the transparent conductive line 44A has a function of protecting the outer contact pad 48B of the non-transparent conductive line 44B from damage and oxidation, which may influences the electrical conductive characteristics.

The second transparent substrate 34 includes a black matrix pattern 52, which is disposed on the surface of the second transparent substrate 34 facing the first transparent substrate 32 and corresponding to the peripheral region 40 of the first transparent substrate 32, used to shield the light leakage in the peripheral region 40 coming from the backlight source of the liquid crystal display panel 30 while displaying. Besides, the sealant 36 is disposed in the peripheral region 40 between the first transparent substrate 32 and the second transparent substrate 34, and positioned on the top of the transparent conductive line 44A and non-transparent conductive line 44B so as to combine the first transparent substrate 32 with the second transparent substrate 34. As described, the sealant 36 has to be irradiated by ultraviolet beam so as to become sticky and form a bonding. Since the black matrix pattern 52 is disposed on the second transparent substrate 34, the irradiation of ultraviolet beam accordingly needs to come from the direction of the first transparent substrate 32. In view of the fact, the transparent conductive lines 44A and the non-transparent conductive lines 44B are alternately disposed in the peripheral region 40 of the liquid crystal display panel 30 of the present invention. The metal wires 42 (such as scan lines or/and data lines) in the display region 38 are electrically connected to the peripheral region 40 by the transparent conductive lines 44A and the non-transparent conductive lines 44B so as to be further electrically connected to driver ICs. In addition, the transparent conductive lines 44A allow penetration of light beams (as indicated by narrows in FIG. 4). In this way, the overall transmittance can be improved, and the sealant 36 disposed thereon can be irradiated completely by ultraviolet beam without contaminating the liquid crystal molecules. Moreover, in the fabrication of high-resolution and tiny size liquid crystal display panels, the arrangement density of the metal conductive lines 22 will be excessively high. This increases fabrication difficulty due to process limitation. In view of this, the present invention uses alternately arranged transparent conductive lines 44A and non-transparent conductive lines 44B made of different conductive materials to increase process window and improve process yield.

In summary, the liquid crystal display panel of the present invention utilizes alternatively arranged transparent conductive lines and non-transparent conductive lines so as to increase the overall transmittance. As a result, the sealant in the peripheral region can be irradiated completely without contaminating the liquid crystal molecules. Moreover, the alternately arranged transparent conductive lines 44A and non-transparent conductive lines 44B made of different conductive materials are able to increase process window and improve process yield.

Those skilled in the art will readily observe that numerous modifications and alterations of the device and method may be made while retaining the teachings of the invention.

What is claimed is:

1. A liquid crystal display panel, comprising:
   a first transparent substrate comprising a peripheral region and a display region, and a plurality of conductive lines disposed in the peripheral region and a plurality of metal wires disposed in the display region, wherein the conductive lines comprise a plurality of transparent conductive lines and a plurality of non-transparent conductive lines and the metal wires comprise a plurality of first metal wires, wherein each of the first metal wires comprises an inner contact pad extending to the peripheral region between a sealant and the display region, and each of the transparent conductive lines partially overlaps with each of the corresponding inner contact pads in a perpendicular direction;
   a second transparent substrate disposed opposite to the first transparent substrate; and
   the sealant disposed in the peripheral region between the first transparent substrate and the second transparent substrate.

2. The liquid crystal display panel of claim 1, wherein the transparent conductive lines and the non-transparent conductive lines are alternately arranged.

3. The liquid crystal display panel of claim 1, wherein the metal wires in the display region and the non-transparent conductive lines in the peripheral region are made of a same metal layer.

4. The liquid crystal display panel of claim 1, wherein the metal wires further comprise a plurality of second metal wires.

5. The liquid crystal display panel of claim 1, wherein the first transparent substrate further comprises an insulating layer disposed between the transparent conductive lines and the inner contact pads, the insulating layer comprises a plurality of contact holes exposing each of the inner contact pads respectively, and each of the transparent conductive lines is embedded in each of the contact holes, and electrically connected to the inner contact pad of each of the first metal wires.

6. The liquid crystal display panel of claim 1, wherein each of the first metal wires further comprises an outer contact pad disposed in the peripheral region outside the sealant, and each of the transparent conductive lines partially overlaps with the sealant, and is electrically connected to the outer contact pad of each of the first metal wires.

7. The liquid crystal display panel of claim 4, wherein each of the second metal wires is directly connected to each of the corresponding non-transparent conductive lines to form an electrical connection therebetween, each of the non-transparent conductive lines partially overlaps with the sealant, and each of the non-transparent conductive lines comprises an outer contact pad disposed in the peripheral region outside the sealant.

8. The liquid crystal display panel of claim 1, wherein the metal wires comprise a plurality of scan lines.

9. The liquid crystal display panel of claim 1, wherein the metal wires comprise a plurality of data lines.

10. The liquid crystal display panel of claim 1, wherein the second transparent substrate comprises a black matrix pattern disposed on a surface of the second transparent substrate facing the first transparent substrate and corresponding to the peripheral region of the first transparent substrate.

* * * * *